(12) United States Patent
Gao et al.

(10) Patent No.: US 10,254,593 B2
(45) Date of Patent: Apr. 9, 2019

(54) DISPLAY PANEL AND DISPLAY DEVICE

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Yuekai Gao, Beijing (CN); Jian Li, Beijing (CN); Yuguang Fan, Beijing (CN); Yongshan Zhou, Beijing (CN); Jingpeng Li, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 15/505,813

(22) PCT Filed: Sep. 20, 2016

(86) PCT No.: PCT/CN2016/099456
§ 371 (c)(1),
(2) Date: Feb. 22, 2017

(87) PCT Pub. No.: WO2017/059767
PCT Pub. Date: Apr. 13, 2017

(65) Prior Publication Data
US 2018/0210259 A1 Jul. 26, 2018

(30) Foreign Application Priority Data
Oct. 10, 2015 (CN) .......................... 2015 1 0651161

(51) Int. Cl.
G02F 1/1339 (2006.01)
G02F 1/1333 (2006.01)
(Continued)

(52) U.S. Cl.
CPC ........ *G02F 1/13394* (2013.01); *G02F 1/1339* (2013.01); *G02F 1/13392* (2013.01);
(Continued)

(58) Field of Classification Search
CPC .. G02F 1/1339; G02F 1/13394; G02F 1/1341; G02F 2001/13398; G02F 1/1368;
(Continued)

(56) References Cited

U.S. PATENT DOCUMENTS 5,539,546 A * 7/1996 Koden .............. G02F 1/133377
349/143
6,115,098 A * 9/2000 Kume .................. G02F 1/1393
349/130
(Continued)

FOREIGN PATENT DOCUMENTS

CN 101526701 A 9/2009
CN 101661196 A 3/2010
(Continued)

OTHER PUBLICATIONS

Second Office Action for Chinese Application No. 201510651161.1, dated Jul. 31, 2017, 5 Pages.
(Continued)

*Primary Examiner* — Hoan C Nguyen
(74) *Attorney, Agent, or Firm* — Brooks Kushman P.C.

(57) ABSTRACT

A display panel and a display device are provided in the present disclosure. The display panel includes an array substrate, a color filter substrate and a liquid crystal layer arranged between the array substrate and the color filter substrate. A liquid crystal blocking component is arranged between the array substrate and the color filter substrate, a display region of the display panel is divided into at least two display sub-regions by the liquid crystal blocking com-
(Continued)

ponent which is configured to block liquid crystals from flowing between the at least two display sub-regions.

20 Claims, 3 Drawing Sheets

(51) Int. Cl.
  *G02F 1/1341* (2006.01)
  *G02F 1/1368* (2006.01)
(52) U.S. Cl.
  CPC ...... *G02F 1/133377* (2013.01); *G02F 1/1341* (2013.01); *G02F 1/1368* (2013.01); *G02F 2001/13396* (2013.01); *G02F 2001/13398* (2013.01)
(58) Field of Classification Search
  CPC ..... G02F 2001/13396; G02F 1/133377; G02F 1/141; G02F 2001/134345; G02F 2203/30
  See application file for complete search history.

(56) References Cited

U.S. PATENT DOCUMENTS

| | | | | |
|---|---|---|---|---|
| 6,672,921 | B1* | 1/2004 | Liang | G02F 1/133377 264/496 |
| 2005/0122446 | A1* | 6/2005 | Jeon | G02F 1/133512 349/110 |
| 2007/0085968 | A1* | 4/2007 | Hsu | C09K 19/60 349/165 |
| 2007/0268446 | A1* | 11/2007 | Jeng | B82Y 20/00 349/166 |
| 2008/0278670 | A1* | 11/2008 | Abe | G02F 1/133377 349/144 |
| 2013/0308084 | A1* | 11/2013 | Niwano | G02F 1/1339 349/155 |
| 2015/0029432 | A1 | 1/2015 | Ishikawa et al. | |
| 2016/0341992 | A1 | 11/2016 | Lee et al. | |

FOREIGN PATENT DOCUMENTS

| | | | |
|---|---|---|---|
| CN | 201917747 U | | 8/2011 |
| CN | 203673188 U | | 6/2014 |
| CN | 104570498 A | | 4/2015 |
| CN | 105137666 A | | 12/2015 |
| JP | 2009115933 A | * | 5/2009 |

OTHER PUBLICATIONS

International Search Report and Written Opinion for Application No. PCT/CN2016/099456 dated Nov. 28, 2016, 14 Pages.
First Office Action for Chinese Application No. 201510651161.1, dated Feb. 6, 2017, 6 Pages.

* cited by examiner

DISPLAY PANEL AND DISPLAY DEVICE

CROSS-REFERENCE TO RELATED APPLICATIONS

This application is the U.S. national phase of PCT Application No. PCT/CN2016/099456 filed on Sep. 20, 2016, which claims priority to Chinese Patent Application No. 201510651161.1 filed on Oct. 10, 2015, the disclosures of which are incorporated in their entirety by reference herein.

TECHNICAL FIELD

The present disclosure relates to the field of display, and in particular to a display panel and a display device.

BACKGROUND

Along with application and development of on-board display products, the on-board display product, which only has the display function previously, has become a control center of a vehicle. A size of the display screen of the on-board display product is increased gradually, and a physical button is gradually replaced by a touch button. People are expecting for better display quality and operation experience. As a result, a more advanced thin film transistor liquid crystal display (TFT-LCD) panel is required. In contrast to a mobile terminal having a 6-inch or smaller display screen, a panel of a large-sized display product has a large area, and a larger amount of liquid crystals is needed accordingly, so that the liquid crystals are prone to aggregate at a partial region of the display panel.

The on-board display product is typically fixed vertically in a vehicle, and thus when the vehicle is moving, the liquid crystals in the on-board display product are more prone to aggregate at the partial region due to factors such as gravity, acceleration, and high-temperature. In addition, cell gaps, amounts of liquid crystals and the like may be different in respective regions of the display panel, transmissivity in the respective regions may be different from each other, especially when the display product is in a black-white display mode). As a result, the display quality of the display panel may be adversely affected due to dark not uniform.

SUMMARY

An object of the present disclosure is to provide a technical solution, such that when the display panel is moving or arranged in a vertical direction, it enables to prevent liquid crystals in a cell of a display panel from aggregating at a partial region of the display panel due to factors such as gravity, acceleration, and high-temperature, thereby improving the display quality of the display panel.

To achieve the above object, a display panel is provided in the present disclosure. The display panel includes: an array substrate; a color filter substrate; and a liquid crystal layer arranged between the array substrate and the color filter substrate. A liquid crystal blocking component is arranged between the array substrate and the color filter substrate, and the liquid crystal blocking component is configured to divide a display region of the display panel into at least two display sub-regions, and block liquid crystals from flowing between the at least two display sub-regions.

Optionally, the liquid crystal blocking component includes at least one first liquid crystal blocking strip parallel to an edge of the display panel Optionally, the liquid crystal blocking component further includes at least one second liquid crystal blocking strip perpendicular to the first liquid crystal blocking strip.

Optionally, at least one of the first liquid crystal blocking strip and the second liquid crystal blocking strip includes a plurality of blocks spaced apart from each other Optionally, the first liquid crystal blocking strip and the second liquid crystal blocking strip cross to form a crossing portion.

Optionally, the first liquid crystal blocking strip is not interrupted at a middle position, and the second liquid crystal blocking strip is interrupted at a middle position.

Optionally, each of the blocks is of a small length, and a gap between adjacent blocks is small.

Optionally, the display panel further includes a first elastic supporting component and a second elastic supporting component. The first elastic supporting component and the second elastic supporting component are arranged between the array substrate and the color filter substrate, a height of the first elastic supporting component is larger than a height of the second elastic supporting component, and a height of the liquid crystal blocking component is larger than the height of the second elastic supporting component and smaller than the height of the first elastic supporting component.

Optionally, a height of the liquid crystal blocking component is equal to the height of the first elastic supporting component.

Optionally, each of the first elastic supporting component and the second elastic supporting component is of an isolated island design.

Optionally, the first elastic supporting component, the second elastic supporting component and the liquid crystal blocking component are made of an identical elastic material.

Optionally, the liquid crystal blocking component is arranged in a region corresponding to a black matrix region of the color filter substrate.

Optionally, the first liquid crystal blocking strip and the second liquid crystal blocking strip are both made of a transparent material.

Optionally, the first liquid crystal blocking strip and the second liquid crystal blocking strip are both arranged in a region corresponding to the display region.

Optionally, each of the display sub-regions is of an identical area.

Optionally, the display sub-regions are of different areas.

Optionally, the elastic material is a light shielding material.

A display device is further provided in the present disclosure, including the display panel hereinabove.

According to the display panel and the display device in the present disclosure, in contrast to the related art, the entire display region of the display panel is divided into a plurality of small display regions, and the liquid crystals are blocked from flowing between adjacent small display regions by the liquid crystal blocking strip arranged therebetween, so as to prevent the liquid crystals in the entire display region from aggregating at a partial region of the display panel due to factors such as the gravity, the acceleration and the high-temperature, thereby enabling an image being displayed to be in uniform, and improving the display quality of the display panel.

BRIEF DESCRIPTION OF THE DRAWINGS

In order to illustrate the technical solutions of the present disclosure in a clearer manner, the drawings desired for the present disclosure will be described hereinafter briefly. Obviously, the following drawings merely relate to some embodiments of the present disclosure, and based on these drawings, a person skilled in the art may obtain other drawings without any creative effort.

DETAILED DESCRIPTION

Figure 1:
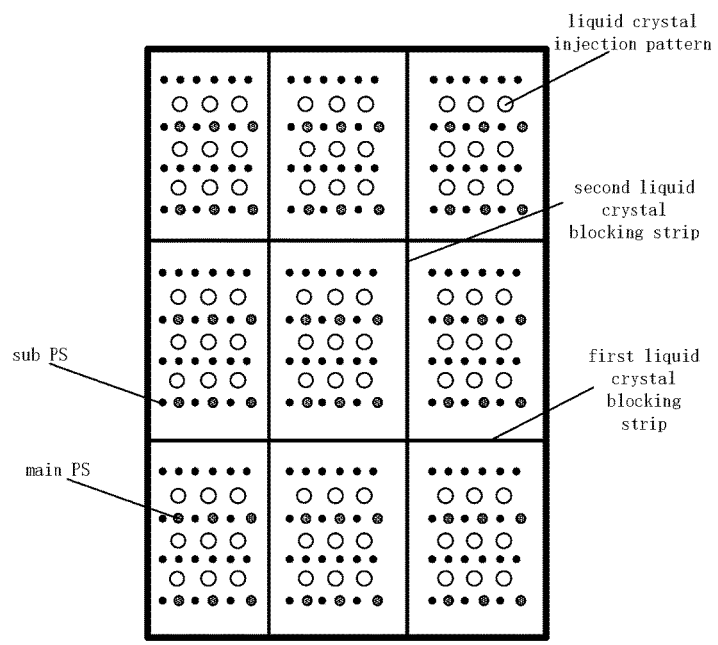
FIG. 1 is a schematic view of a display panel according to some embodiments of the present disclosure.

The technical solution of the present disclosure will be described hereinafter in a clear and complete manner in conjunction with the drawings related to the embodiments. Obviously, the following embodiments merely relate to a part of, rather than all of, the embodiments of the present disclosure, and based on these embodiments, a person skilled in the art may, without any creative effort, obtain the other embodiments, which also fall within the scope of the present disclosure.

In the related art, the on-board display product with a large-sized display screen is adversely affected by factors such as the gravity, the acceleration and the high-temperature when the vehicle is moving, and the liquid crystals in the display screen are prone to aggregate at a partial region of the display panel, such that the display quality of the display screen may be significantly degraded. It should be noted that, the above defect may occur not only in the on-board display product but also other moving display panels.

In view of above, the present disclosure provides in some embodiments a solution, in which a large-sized display panel is divided into a plurality of regions independent to each other, and a photo spacer (PS for short, i.e., a supporting component made of a light shielding material) wall having a specific structure is arranged between the adjacent independent regions, whereby it is able to effectively prevent the liquid crystals in the large-sized display panel from aggregating at a partial region of the display panel.

A display panel is provided in the present disclosure, including an array substrate; a color filter substrate; and a liquid crystal layer arranged between the array substrate and the color filter substrate. A liquid crystal blocking component is arranged between the array substrate and the color filter substrate, the entire display region of the display panel is divided into at least two display sub-regions by the liquid crystal blocking component which is configured to block liquid crystals from flowing between the display sub-regions. The liquid crystal blocking component forms the PS wall between the display sub-regions.

According to some embodiments of the present disclosure, the liquid crystal blocking component includes at least one first liquid crystal blocking strip parallel to an edge of the display panel.

In other words, it is able to divide the entire display region into two display sub-regions with only one first liquid crystal blocking strip, where an extending direction of the first liquid crystal blocking strip may be parallel to a long edge or a short edge of the display panel. Obviously, in order to meet the requirement of the large-sized screen display in a moving scenario such as the vehicle scenario, for example, the first liquid crystal blocking strip may be arranged horizontally when the large-sized screen is fixed vertically, such that the two display sub-regions divided by the first liquid crystal blocking strip in a moving scenario may be less likely to be adversely affected by the gravity and acceleration during the movement, thereby preventing the crystal liquids from aggregating at a bottom portion of the large-sized screen.

Obviously, when there exists a plurality of first liquid crystal blocking strips, there is a plurality of display sub-regions. Theoretically, the more the display sub-regions are, the less likely the liquid crystals would aggregate at a partial region of the display panel. However, the display effect of the display panel also may be adversely affected if there are too many display sub-regions. Therefore, the quantity of the display sub-regions may be determined as needed. That is, it is preferred that the quantity of the first liquid crystal blocking strips is determined based on the actual display requirement.

According to some embodiments of the present disclosure, the liquid crystal blocking component further includes at least one second liquid crystal blocking strip perpendicular to the first liquid crystal blocking strip.

In other words, in addition to arrange the first liquid crystal blocking strip, it is also arranged the second liquid crystal blocking strip perpendicular to the first liquid crystal blocking strip, and that is advantageous as the entire display region of the display panel may be divided along a two-dimensional direction into four display sub-regions arranged horizontally and vertically in the case that there are merely one first liquid crystal blocking strip and one second liquid crystal blocking strip. In the case that there are two first liquid crystal blocking strips and two second liquid crystal blocking strips, the entire display region may be divided into nine display sub-regions.

In a practical application, the areas of the display sub-regions may be identical or different, which may be determined as needed. For example, as shown in FIG. 1 where the entire display region is divided into nine display sub-regions, an area of a display sub-region at the top left of the display region is smaller than an area of another display sub-region at the top right of the display region. Obviously, in the case that the respective areas of the display sub-regions are different, the lengths of the first liquid crystal blocking strip and the second liquid crystal blocking strip may be adjusted correspondingly based on an actual design requirement.

For example, referring to FIG. 1, which is a schematic view of a display panel according to some embodiments of the present disclosure, a display region of the display panel is divided into nine display sub-regions (i.e., nine identical small display regions), the liquid crystals are prevented from flowing between two adjacent small display regions by the first liquid crystal blocking strip (that may be arranged horizontally or vertically) and the second liquid crystal blocking strip (that may be arranged vertically or horizontally) arranged between the two adjacent small display regions, such that a phenomenon of the aggregation of the liquid crystals may be reduced or even eliminated.

Obviously, as shown in FIG. 1, the first liquid crystal blocking strips between the small display regions are arranged horizontally, and the second liquid crystal blocking strips between the small display regions are arranged vertically. In addition, each of the first and the second liquid crystal blocking strips is not broken, but the present disclosure is not limited thereto. According to some embodiments of the present disclosure, the first liquid crystal blocking strip and/or the second liquid crystal blocking strip includes a plurality of blocks spaced apart from each other. In other words, the above arrangement includes three cases as follows: (1) the first liquid crystal blocking strip consists of a plurality of blocks spaced apart from each other as indicated by the dotted line, while the second liquid crystal blocking strip is not broken; (2) the first liquid crystal blocking strip is not broken, while the second liquid crystal blocking strip consists of a plurality of blocks spaced apart from each other as indicated by the dotted line; (3) each of the first and the second liquid crystal blocking strips consists of a plurality of blocks spaced apart from each other as indicated by the dotted lines.

Figure 2:
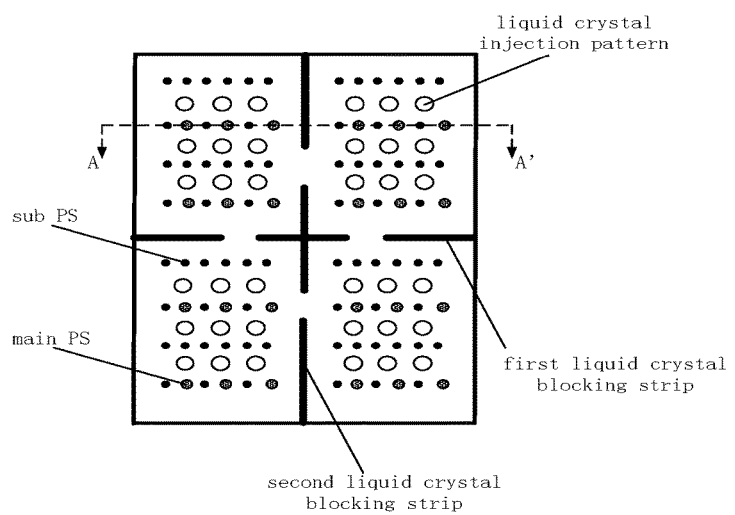
FIG. 2 is a schematic view of a display panel in a first arrangement according to some embodiments of the present disclosure.
Figure 3:
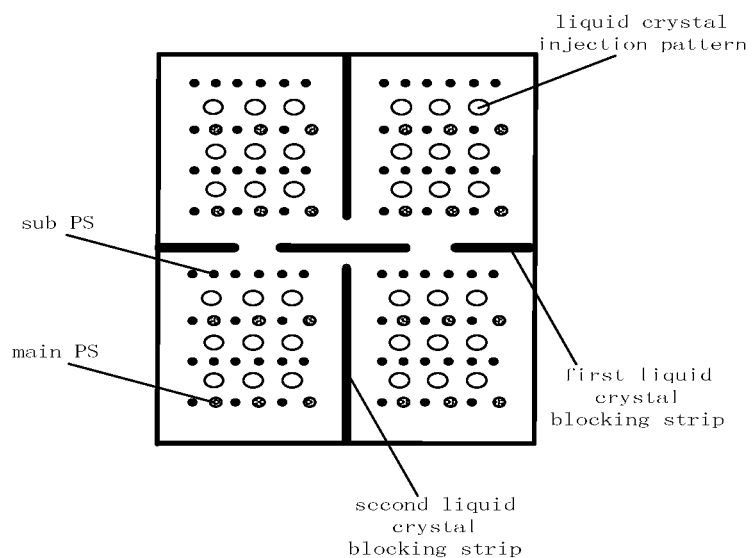
FIG. 3 is a schematic view of a display panel in a second arrangement according to some embodiments of the present disclosure.
Figure 4:
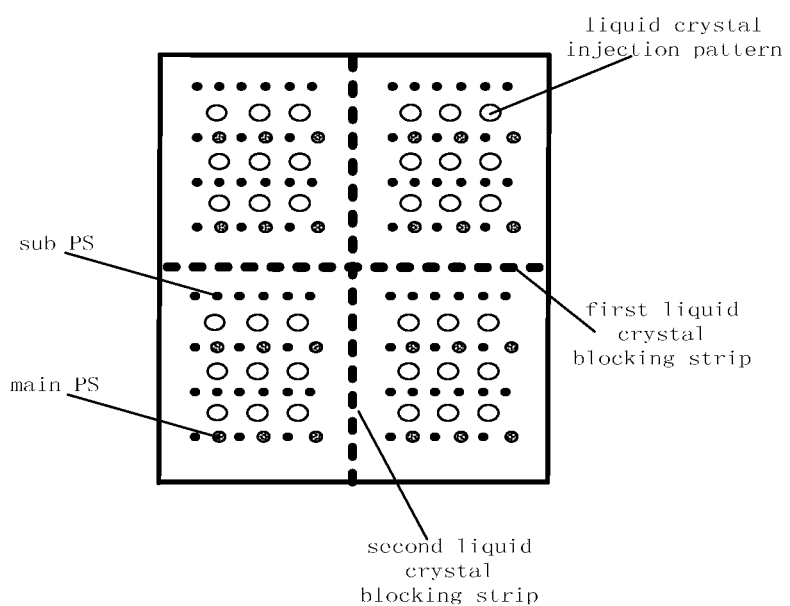
FIG. 4 is a schematic view of a display panel in a third arrangement according to some embodiments of the present disclosure.

The above three cases differ from each other only in terms of the way of combination, and the only the case (3) will be illustrated hereinafter. Referring to FIGS. 2 to 4, where FIG. 2 is a schematic view of a display panel in a first arrangement according to some embodiments of the present disclosure, FIG. 3 is a schematic view of a display panel in a second arrangement according to some embodiments of the present disclosure, and FIG. 4 is a schematic view of a display panel in a third arrangement according to some embodiments of the present disclosure.

As shown in FIG. 2, each of the first and the second liquid crystal blocking strips consist of a plurality of blocks spaced apart from each other. However, in order to block the liquid crystals more effectively, the first liquid crystal blocking strip and the second liquid crystal blocking strip cross to form a crossing portion. The liquid crystals in such arrangement may be blocked less effectively than the arrangement where both the first and the second liquid crystal blocking strips are not broken; however, due to the crossing portion corresponding to a center of the four display sub-regions adjacent to each other, the liquid crystals may still be effectively blocked from flowing between two display sub-regions which are not adjacent to each other (e.g., the two display sub-regions arranged at upper left and lower right respectively), thereby to reduce the aggregation of the liquid crystals.

As shown in FIG. 3, the first liquid crystal blocking strip is not interrupted at a middle position, while the second liquid crystal blocking strip is interrupted at a middle position. As such, the liquid crystals may flow between the two display sub-regions at the upper side, while the flowing of the liquid crystals between the display sub-regions at the upper side and the display sub-regions at the lower side may not be evident. Moreover, since the factor of gravity mainly affects the flowing of the liquid crystals along a vertical direction, the aggregation of the liquid crystals may still be reduced effectively by the arrangement shown in FIG. 3.

As shown in FIG. 4, the blocks of the first and the second liquid crystal blocking strips each has a small length, and a gap between adjacent blocks is small, therefore it is difficult for the liquid crystals at any adjacent two display sub-regions to pass through the gap between the blocks due to factors such as the gravity and acceleration, and the aggregation of the liquid crystals may still be reduced effectively by the arrangement shown in FIG. 4.

Obviously, the above arrangements are merely the preferred arrangements provided in the embodiments of the present disclosure. In a practical design, the first and/or the second liquid crystal blocking strips may further be arranged in other manners, and the present disclosure is not limited thereto.

Figure 5:
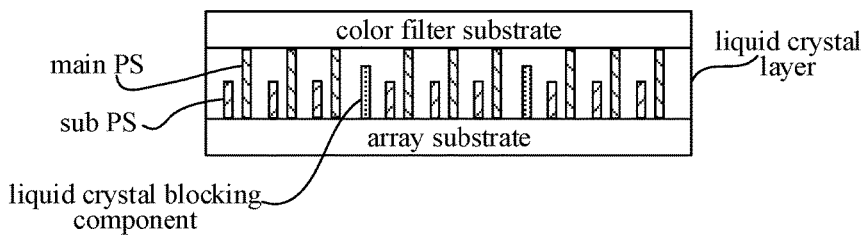
FIG. 5 is a cross section view of the display panel in FIG. 2 along a line A-A' when a height of a liquid crystal blocking component is smaller than a height of a first elastic supporting component.

According to some embodiments of the present disclosure, the display panel may further include the first and the second elastic supporting components arranged between the array substrate and the color filter substrate. A height of the first elastic supporting component is larger than a height of the second elastic supporting component, and each of heights of both the first and the second liquid crystal blocking strips is larger than the height of the second elastic supporting component and smaller than or equal to the height of the first elastic supporting component. FIG. 5 is a cross section view of the display panel in FIG. 2 along a line A-A' when the display panel includes such first and second elastic supporting components.

The first elastic supporting component may be made of an elastic material identical to the second elastic supporting component, and the first and the second liquid crystal blocking strips may also be made of the elastic material. In other words, the first and the second liquid crystal blocking strips may be made of an elastic material of the first and the second elastic supporting components. According to some embodiments of the present disclosure, the elastic material may be a light shielding material.

Figure 6:
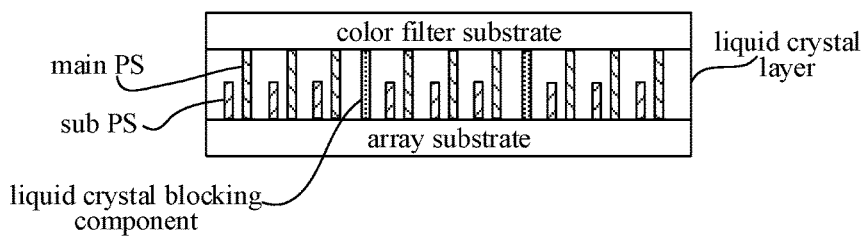
FIG. 6 is a cross section view of the display panel in FIG. 2 along the line A-A' when the height of the liquid crystal blocking component is equal to the height of the first elastic supporting component.

The first elastic supporting component may be referred to as a main PS, and the second elastic supporting component may be referred to as a sub PS. As shown in FIGS. 5 and 6, in a practical application, each of the main PS and the sub PS is of an isolated island design, so as to facilitate the liquid crystal injection.

In other words, each of the heights of both the first and the second liquid crystal blocking strips may be between the height of the second elastic supporting component (i.e., the sub PS) and the height of the first elastic supporting component (i.e., the main PS). The main PS and the sub PS are both made of an elastic material, and the main PS may be completely compressed, so the more closer the heights of the first and the second liquid crystal blocking strips is to the height of the main PS, the more effectively the liquid crystals may be blocked. Optionally, the heights of the first and the second liquid crystal blocking strips may be equal to the height of the first elastic supporting component (i.e., the main PS), so that the first and the second liquid crystal blocking strips may block the liquid crystals more effectively. FIG. 6 is a cross section view of the display panel in FIG. 2 along the line A-A' when the display panel includes such first and second elastic supporting components.

Figure 7:
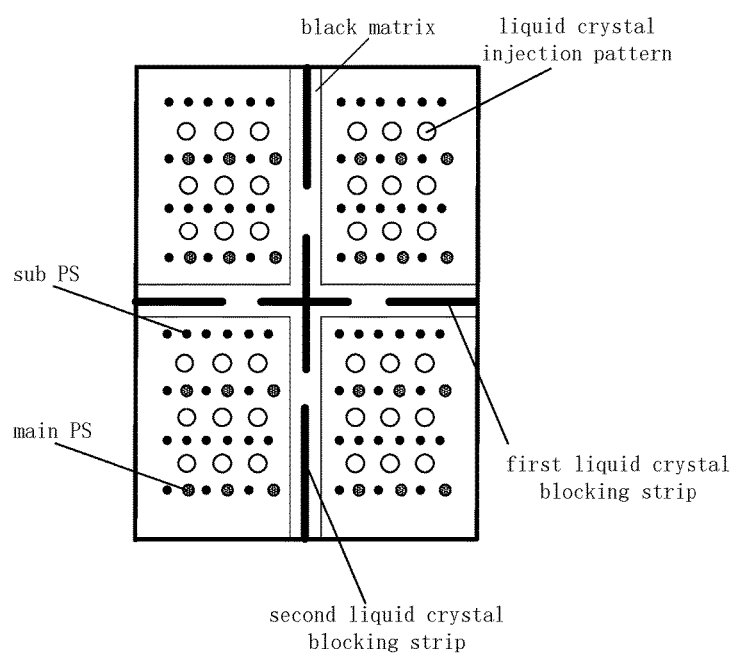
FIG. 7 is a schematic view of a display panel where the liquid crystal blocking component is arranged in a region corresponding to a black matrix region of a color filter substrate according to some embodiments of the present disclosure.

According to some embodiments of the present disclosure, both the first and the second liquid crystal blocking strips may be arranged in a region corresponding to a black matrix region of the color filter substrate (in other words, as shown in FIG. 7 for example, when the array substrate and the color filter substrate are aligned to form a cell, the black matrix covers both the first and the second liquid crystal blocking strips), which is applicable to the case that the first and the second liquid crystal blocking strips are both made of the elastic material of the main PS and the sub PS.

Because the elastic materials of the main PS and the sub PS are nontransparent, it is necessary to arrange both the first and the second liquid crystal blocking strips at the region corresponding to the black matrix region of the color filter substrate in order to not adversely affect the display.

Obviously, both the first and the second liquid crystal blocking strips may also be made of a transparent material. In this case, the region where the first and the second liquid crystal blocking strips are arranged is not limited. The first and the second liquid crystal blocking strips may be arranged in the black matrix region of the color filter substrate or the display region, while the display quality of the display panel may not be adversely affected no matter which region the first and the second liquid crystal blocking strips are arranged.

According to some embodiments of the present disclosure, the first and the second liquid crystal blocking strips may be arranged as the PS walls. In a practical application, the liquid crystal injection pattern needs to be redesigned, namely that the amount of the liquid crystals injected into respective divided regions is determined in proportion to the areas of respective divided regions, and that is easy to be implemented.

According to the display panel in the present disclosure, in compared with the display panel with the large-sized screen in the related art, it is able to prevent or restrain the liquid crystals from aggregating at a partial region of the display panel at the display region due to factors such as the gravity, acceleration or high-temperature. In addition, the display panel has good display uniformity, the non-uniform gray scale due to the non-uniform cell gap is prevented from occurring, and in a process of touch operation, the movement of the liquid crystals caused by a pressure applied to the panel is restrained, thereby the ripple caused by the pressure may be prevented.

A display device is further provided in the present disclosure, including the display panel hereinabove. The display device may be applied to any product or component with the display function, such as a cell phone, a tablet PC, a television, a monitor, a notebook computer, a digital photo frame and a navigator. The display device may obtain technical effects similar to those of the above display panel. For the implementation of the display device, it may refer to the above implementation of the display panel in the above embodiments, and the description thereof in conjunction with drawings is omitted herein.

According to the embodiments of the present disclosure, a large panel of the thin film transistor-liquid crystal display (TFT-LCD) in the related art is divided into several region independent to each other by adding PS walls, thereby blocking the liquid crystals from diffusing between the regions. The amount of the liquid crystals injected into respective divided regions is determined in proportion to the areas of respective divided regions, thereby guaranteeing display uniformity of the entire display panel.

The above are merely the preferred embodiments of the present disclosure. It should be noted that, a person skilled in the art may make further modifications and improvements without departing from the principle of the present disclosure, and these modifications and improvements shall also fall within the scope of the present disclosure.

What is claimed is:
1. A display panel, comprising:
   an array substrate;
   a color filter substrate;
   a plurality of supporting components comprising a plurality of first supporting components and a plurality of second supporting components; and
   a liquid crystal layer arranged between the array substrate and the color filter substrate; wherein
   a liquid crystal blocking component is arranged between the array substrate and the color filter substrate, and the liquid crystal blocking component is configured to divide a display region of the display panel into at least two display sub-regions, and block liquid crystals from flowing between the at least two display sub-regions;
   each of the first supporting components and the second supporting components is arranged between the array substrate and the color filter substrate, each of the first supporting components is of a first height, each of the second supporting components is of a second height, the first height is larger than the second height;
   the supporting components are arranged in an array comprising at least four consecutive rows; and
   with respect to any two adjacent rows of the at least four consecutive rows, at least four of the second supporting components are arranged in one of the two adjacent rows, none of the first supporting components is arranged in the one of the two adjacent rows, and at least two of the first supporting components and at least other two of the second supporting components are arranged alternately in the other one of the two adjacent rows.

2. The display panel according to claim 1, wherein the liquid crystal blocking component comprises at least one first liquid crystal blocking strip parallel to an edge of the display panel.

3. The display panel according to claim 2, wherein the liquid crystal blocking component further comprises at least one second liquid crystal blocking strip perpendicular to the first liquid crystal blocking strip.

4. The display panel according to claim 3, wherein at least one of the first liquid crystal blocking strip and the second liquid crystal blocking strip comprises a plurality of blocks spaced apart from each other.

5. The display panel according to claim 3, wherein the first liquid crystal blocking strip and the second liquid crystal blocking strip cross to form a crossing portion.

6. The display panel according to claim 3, wherein the first liquid crystal blocking strip is not interrupted at a middle position, and the second liquid crystal blocking strip is interrupted at a middle position.

7. The display panel according to claim 4, wherein each of the blocks is of a small length, and a gap between the adjacent blocks is small.

8. The display panel according to claim 1, wherein
   the first supporting components are first elastic supporting components, the second supporting components are second elastic supporting components, the liquid crystal blocking component is of a third height, and the third height is larger than the second height and smaller than the first height.

9. The display panel according to claim 1, wherein
   the first supporting components are first elastic supporting components, the second supporting components are second elastic supporting components, the liquid crystal blocking component is of a third height, and the third height is larger than the second height and equal to the first height.

10. The display panel according to claim 8, wherein each of the first elastic supporting components and the second elastic supporting components is of an isolated island design.

11. The display panel according to claim 8, wherein the first elastic supporting components, the second elastic supporting components and the liquid crystal blocking component are made of an identical elastic material.

12. The display panel according to claim 1, wherein the liquid crystal blocking component is made of a transparent material.

13. The display panel according to claim 1, wherein the liquid crystal blocking component is arranged in a region corresponding to a black matrix region of the color filter substrate.

14. The display panel according to claim 12, wherein the liquid crystal blocking component is arranged in a region corresponding to the display region.

15. The display panel according to claim 1, wherein each of the display sub-regions is of an identical area.

16. The display panel according to claim 1, wherein the display sub-regions are of different areas.

17. The display panel according to claim 11, wherein the elastic material is a light shielding material.

18. A display device, comprising the display panel according to claim 1.

19. The display panel according to claim 4, wherein the first liquid crystal blocking strip and the second liquid crystal blocking strip cross to form a crossing portion.

20. The display panel according to claim 4, wherein the first liquid crystal blocking strip is not interrupted at a middle position, and the second liquid crystal blocking strip is interrupted at a middle position.

* * * * *